(12) United States Patent
Lee

(10) Patent No.: US 7,721,640 B2
(45) Date of Patent: May 25, 2010

(54) CABLE OPERATED GAS CYLINDER

(75) Inventor: Ho Min Lee, Seoul (KR)

(73) Assignee: Samhongsa Co., Ltd., Seoul (KR)

( * ) Notice: Subject to any disclaimer, the term of this patent is extended or adjusted under 35 U.S.C. 154(b) by 303 days.

(21) Appl. No.: 11/766,676

(22) Filed: Jun. 21, 2007

(65) Prior Publication Data

US 2008/0041224 A1 Feb. 21, 2008

(30) Foreign Application Priority Data

Jun. 27, 2006 (KR) ............... 10-2006-0058349

(51) Int. Cl.
*F15B 11/08* (2006.01)
*A47C 1/06* (2006.01)

(52) U.S. Cl. .................... 91/437; 297/344.19

(58) Field of Classification Search ............ 91/437; 297/344.19
See application file for complete search history.

(56) References Cited

U.S. PATENT DOCUMENTS

2004/0124570 A1* 7/2004 Huh et al. ............. 267/64.12

2005/0022661 A1* 2/2005 Zanden ................. 91/437

FOREIGN PATENT DOCUMENTS

| KR | 1020000007287 | 2/2000 |
| KR | 1020000008481 | 2/2000 |
| KR | 1020040092715 | 11/2004 |

* cited by examiner

*Primary Examiner*—Michael Leslie
(74) *Attorney, Agent, or Firm*—IPLA P.A.; James E. Bame

(57) ABSTRACT

A cable operated gas cylinder comprises: a base tube; a spindle which is inserted at hollow part in said base tube; a cylinder which is mounted within said spindle; a piston dividing the gas-filled space within said cylinder into upper part and lower part; a pipe holder sealing airtight the upper part of said cylinder; a gas opening/closing pin which is mounted penetratingly through central part of said pipe holder and for controlling getting in and out of the gas filled within said cylinder; a release arm for controlling the opening/closing of said gas opening/closing pin; a cable for controlling turning of said release arm when being pulled by external force; and a taper holder which receives said release arm therein and rotationally intervenes within said spindle, wherein said release arm and said taper holder are capable of rotating together as said cable rotates.

10 Claims, 6 Drawing Sheets

CABLE OPERATED GAS CYLINDER

CROSS REFERENCE

This application claims foreign priority under Paris Convention and 35 U.S.C. §119 to Korean Patent Application No. 10-2006-0058349, filed Jun. 27, 2006 with the Korean Intellectual Property Office.

BACKGROUND OF THE INVENTION

1. Field of the Invention

The present invention relates generally to a cable operated gas cylinder and more particularly to a cable operated gas cylinder, gotten rid of the phenomenon of kinking or twisting of the cable upon rotation of the chair, thereby operable with enhanced operation reliability and product durability.

2. Background of the Related Art

A gas cylinder is an apparatus formed between a seat of a chair and a chair base for being used in adjusting height of the seat. Also, the gas cylinder may be applied to a variety of apparatus such as an impulse buffering apparatus for a vehicle as well as an apparatus for adjusting height of a seat of a chair.

A general configuration of traditional gas cylinder is shown clearly by a Korean Patent Application No. 10-1998-0028313 entitled as "Gas Cylinder Type of Height Adjuster for Chair" which was applied by the applicant of the present invention and granted for a patent registration by Korean Government.

But, in the gas cylinder of the related art, a gas opening/closing pin should operate up and down directions with use of a separate knob formed on the lower side of a seat of a chair. Therefore, there exists a problem that a user should bend his/her body in order to operate the knob.

In order to solve such inconvenience, Korean Patent Application No. 10-1998-0026546 entitled as "Adjusting Member for Height of Chair", which has been already filed as a patent application by the applicant of the present invention and granted for a patent registration by Korean Government, could be suggested for the related art.

The registered patent "Adjusting Member for Height of Chair" discloses a gas cylinder operating with use of a cable, and additionally having: a separate button additionally installed on a predetermined structure exemplified as an arm rest of a chair; and a cable operated by the button, and the gas cylinder is characterized in that its up and down movements are performed by button pressing.

With such construction, a user could adjust height of a chair by simple button pressing only with a hand, without bending his/her body.

Such "Adjusting Member for Height of Chair" of the relate art, however, has following problems.

On the first place, the apparatus is so complicated that a plurality of various parts is used, and assembling process of the parts is difficult. Also, as a plurality of parts is used, manufacturing costs are increased.

Also, due to the complicated structure of the apparatus, in case where the apparatus is continuously used repeatedly, disorder is frequently generated.

Also, because of user's turning of the chair in use, the cable will twist and kink so that operation reliability of the product becomes lower and even further the product itself gets disordered.

SUMMARY OF THE INVENTION

The present invention was contrived to solve foregoing problems. An object of the present invention is therefore to provide a cable operated gas cylinder, gotten rid of the phenomenon of kinking or twisting of the cable upon rotation of the chair, thereby operable with enhanced operation reliability and product durability.

Another object of the present invention is to provide a cable operated gas cylinder which can be more conveniently operated by a user and more simply assembled at the production spot.

Still another object of the present invention is to provide an operating apparatus of gas cylinder operable with even more increased operational reliability and stability.

Further still another object of the present invention is to provide an operating apparatus of gas cylinder with which can be produced at still further lowered production cost of the gas cylinder.

In order to achieve the foregoing objects, a cable operated gas cylinder according to the present invention comprises: a base tube of hollow tube shape; a spindle which is inserted at hollow part in said base tube and capable of moving up and down according to height adjusting; a cylinder which is, being filled with a gas, mounted within said spindle; a piston which is in contact with inner peripheral plane of said cylinder so as to divide the gas-filled space within said cylinder into upper part and lower part; a pipe holder which is installed at upper part of said cylinder and seals airtight the upper part of said cylinder; a gas opening/closing pin which is mounted penetratingly through central part of said pipe holder and for controlling the gas filled within said cylinder; a release arm which is installed at upper side of said gas opening/closing pin and for controlling the opening/closing of said gas opening/closing pin; a cable, whose one end is fixed at said release arm, for controlling turning of said release arm when being pulled by external force; and a taper holder which receives said release arm therein and rotationally intervenes within said spindle, wherein said release arm and said taper holder are capable of rotating together as said cable rotates.

A chair adopting aforementioned configuration has an advantageous effect that its motion reliability and product durability are enhanced because the cable does not twist or kink even when the chair rotates.

Moreover, manufacturing process at work site can be more simplified as well as convenience in use can be achieved. Due to its simplified configuration, operation stability and reliability of the gas cylinder can be increased, but production cost thereof can be far much lowered.

DETAILED DESCRIPTION OF PREFERRED EMBODIMENTS

Hereinafter embodiments of the present invention will be described in detail in conjunction with the accompanying drawings. But technical concepts of the invention are not limited within the proposed embodiments. On the contrary, by addition of other constituting elements, change or deletion of the constituting elements from the present invention, another retrogressive invention or other embodiments that fall within the scope of the present invention can be easily suggested.

Figure 1:
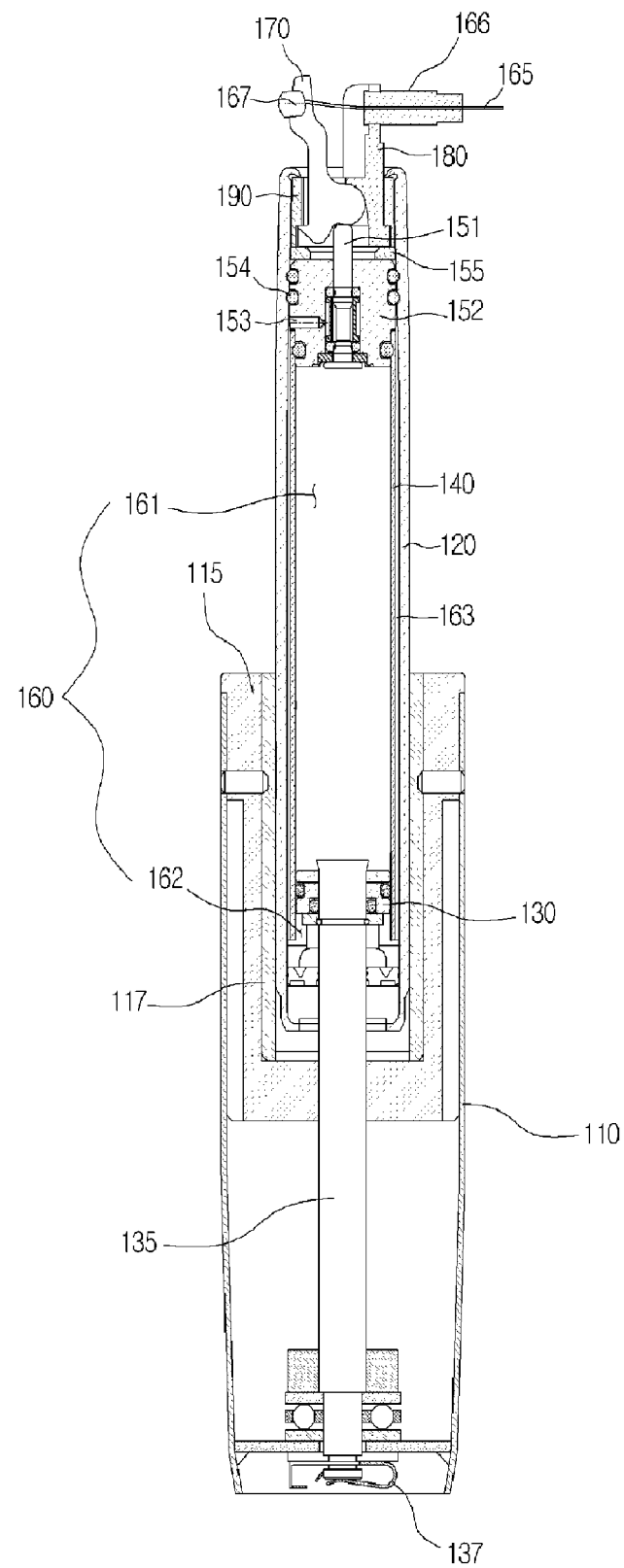
FIG. 1 is a cross-sectional view of a gas cylinder according to the present invention.

FIG. 1 is a cross-sectional view of a gas cylinder according to the present invention.

Referring to FIG. 1, a gas cylinder according to the present invention comprises: a base tube 110 of a hollow tube shape; a spindle 120 of a hollow tube shape inserted at the hollow part of said base tube 110; a tube guide 115 and bushing 117 further inserted at contact plane between said base tube 110 and said spindle 120 in order that up and down movement of said spindle can be done smoothly; and a cylinder 140 of a hollow tube shape further formed at inner peripheral plane of said spindle 120.

Said gas cylinder further comprises: a piston 130 which is in contact with the inner peripheral plane of said cylinder 140 for dividing the gas-filled space in the cylinder 140 into upper chamber 161 and lower chamber 162; a piston rod 135 prolonged downwards whose one end is fixed at said piston 130 and the other end is fixed at lower end of said base tube 110; and a fixing clip 137 for fixing the other end of said piston rod 135 at said base tube 110.

Said gas cylinder further comprises: a pipe holder 152 for sealing airtight the upper part of said cylinder 140; a gas opening/closing pin 151 mounted penetratingly through central part of said pipe holder 152 for enabling the gas within said cylinder 140 to move; an orifice 153 formed within said pipe holder 152 for enabling the gas filled within said pipe holder 152 to move in and out when said opening/closing pin 151 is down; and at least one inner seal 154 inter-positioning at contact plane for airtight sealing between outer peripheral plane of said pipe holder 152 and inner peripheral plane of said spindle 120 and/or cylinder 140.

More particularly, said cylinder is formed with a gas chamber 160 of predetermined length and nitrogen gas is filled in said gas chamber 160. Said gas chamber 160 is divided by said piston 130 into two parts, i.e., upper chamber 161 and lower chamber 162. Up and down movement of said spindle 120 makes change in the volumes between upper chamber 161 and lower chamber 162.

The pressure in said upper chamber 161 and lower chamber 162 maintains a pressure (P2) which is higher than atmosphere (P1). A gas flow path 163 is formed between said cylinder 140 and said spindle 120 for providing a path for gas to move between said upper chamber 161 and lower chamber 162.

There are further comprised of a taper holder 180 formed further at upper side of said pipe holder 152, a taper holder supporter 190 in order for said taper holder 180 to be put over rotationally, a release arm 170 by which a motion of pressing upper end of said gas opening/closing pin 151 can be done, and whose stop position and motion is guided by said tape holder 180, and a cable 165 for enabling said release arm 170 to operate.

Said base tube 110, spindle 120, cylinder 140, release arm 170, taper holder 180, taper holder supporter 190, or the like can preferably be made of metallic materials in order that these parts might be able to sustain against high pressure gas filled within the cylinder 140 and not be broken by stress applied from user's weight. Also material of said pipe holder 152 is metal. But the material thereof is not limited as within metal. Even plastic material might be used also with no limitation as long as it can furnish sufficient strength.

One end of said cable 165 is connected with said release arm 170, and the other end with predetermined button. As for said button, for example, a traditional button structure can be used as it is installed at armrest of a chair. Moreover, one end of said cable 165 can be connected with said release arm 170, and the other end with a predetermined lever.

The button structure or lever structure formed at the other end of said cable 165 in description as above is only for explanatory example. Any structure capable of pulling the cable 165 can be used only if such structure is able to pull the cable 165 within a range of certain length. It does not matter if any other cable-pulling structure already known in any industrial field other than the field related with a gas cylinder is used.

Moreover, a cable holder 166 is further formed fixed at upper end of said taper holder 180 in order that position of said cable 165 is guided.

Said release arm 170 rotates around a predetermined rotational center shaft for operating of said gas opening/closing pin 151. Particularly for positioning of said release arm 170, its position is not fixed, or fixed shaft structure is not adopted as a predetermined center shaft for said rotational center shaft. But by insertion into a predetermined space formed within said taper holder 180, its position can be appointed. Lower side of said release arm 170 is supported by said gas opening/closing pin 151.

Moreover, said taper holder 180 includes, in its inner space, said release arm 170 and is inserted at upper end of said spindle 120. Particularly, by insertion of said release arm 170 within said taper holder 180 for settling its position, the installation process for release arm 170 is finished. Therefore, in this way there is no limitation for said release arm 170 to be operated.

Moreover, said taper holder supporter 190 is formed as a hollow cylindrical shape. At inner space of taper holder supporter 190, the taper holder 180 is combined. In other words, said taper holder supporter 190 is combined with upper end part of inner peripheral plane of said spindle 120, and said taper holder 180 is inserted at inner peripheral plane of taper holder supporter 190. Preferably, outer diameter of said taper holder 180 can be formed smaller to some extent than inner diameter of said taper holder supporter 190. Therefore, in case said cable 165 changes its direction following rotation of chair, said taper holder 180 can rotate by guiding of taper holder supporter 190.

Now, the cable 165, whose position is fixed by insertion at said release arm 170, after its penetration through release arm 170, can be fixed incorporated at end thereof or placed on release arm 170 thanks to a hanger 167 having an additional commodity fixed thereto. Unexplained numeral 155 is a washer.

Thanks to above-described configuration, said taper holder 180 can rotate together with rotation of cable 165 connected to taper holder 180. Hence, kinking or twisting of said cable 165 can be advantageously prevented.

Hereinafter, the operation of a gas cylinder having such a configuration as above is briefly described.

In a state where said cable 165 is not pulled so that said release arm 170 does not work, said gas opening/closing pin 151 is at up-position and the gas does not move or flow.

But when a user gets seated on chair and said cable 165 is pulled by external force, said release arm 170 rotates and moves to right based on FIG. 1 so that gas opening/closing pin 151 gets pressed. When said gas opening/closing pin 151 gets pressed and goes down, a space occurs at lower end part of said pipe holder 152. Then, at inner peripheral plane of said gas opening/closing pin 151, a dented part is formed dented to a predetermined depth. Accordingly, the gas within said upper chamber 161 moves to upper part along the space formed at lower end part of said pipe holder 152. Then, this gas flow moves to said dented part, and further moves through said orifice 153 to a gas flow path 163 formed between spindle 120 and cylinder 140. Also, this gas flow downward along said gas flow path 163 moves further to said lower chamber 162. Accordingly, volume of said lower chamber 162 becomes larger than that of said upper chamber 161, and spindle 120 goes down. Together with these operations, total length of gas cylinder becomes smaller, so seat of the chair moves down.

When the height of chair seat has been adjusted as desired, the external force pulling the cable 165 is removed. If said external force is removed, said gas opening/closing pin 151 moves its position upwards due to the pressure applied from a high pressure gas within upper chamber 161; said release arm 170 and cable 165 can recover to their original positions. Because said gas opening/closing pin 151 has moved upward, gas transfer stops between said gas chambers 161 & 162, and accordingly the position of chair seat gets fixed.

As has been mentioned hereinbefore, one end of said cable 165 is connected with said release arm 170, and the other end with a predetermined button or lever. For example, said button can be installed at armrest part of a chair, and the lever at a tilt mechanism of chair seat.

In this case, when a user rotates the chair, the button installed at armrest of chair and the cable 165 connected with said button also rotate together. And the taper holder 180 connected with said cable 165 and release arm 170 can also rotate in accordance with guiding by said taper holder supporter 190. Thus, the phenomenon of kinking or twisting of said cable 165 can be prevented.

Hereinafter said release arm 170 and taper holder 180 will be described in detail for their configuration.

Figure 2:
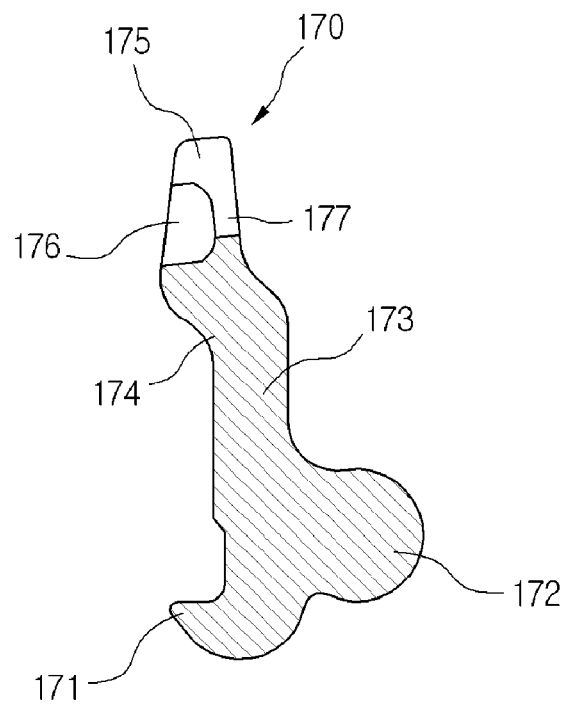
FIG. 2 is a cross-sectional view of a release arm in a gas cylinder according to the present invention.

FIG. 2 is a cross-sectional view of a release arm according to the present invention.

Said release arm can be formed by same thickness for its overall aspect, so it will be described based only on the cross-sectional view thereof.

Said release arm 170 comprises: a hooking prominence 171 which functions as a rotational center by protruding in a shape of a peak formed at one side of lower end part of said release arm; a pin pressing part 172 of slowly curved shape formed at approximately opposite side to said hooking prominence 171; a vertical interval retaining part 173 which is formed extendedly upward from said pin pressing part 172; a horizontal interval retaining part 174 which is formed bent to approximately horizontal direction from said vertical interval retaining part 173; and a cable hooking part 175 which is formed extendedly further upward from said horizontal interval retaining part 174.

Furthermore, said cable hooking part 175 comprises: a cable hooking end 176 formed dented at one side of the cable hooking part 175 in order for end of cable to be fixed, and a cable insertion hole 177 formed penetratingly through cable hooking part 175 at the dented position of said cable hooking end 176. A predetermined hanger (referring to 167 of FIG. 1) can be placed at said cable hooking part 175 in order for the cable not to slip out (referring to 165 of FIG. 1), but it is not compulsory.

Figure 3:
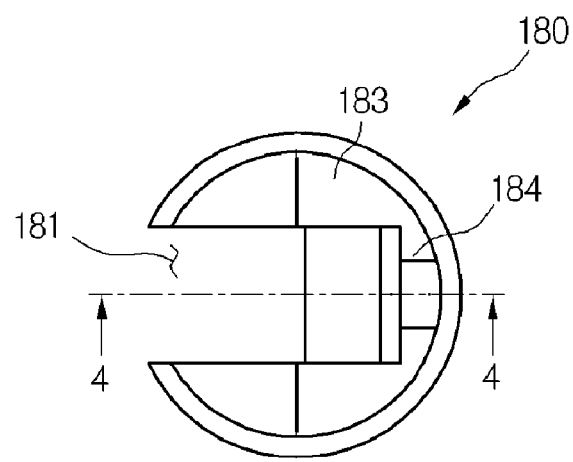
FIG. 3 is a top plan view of a taper holder in a gas cylinder according to the present invention.
Figure 4:
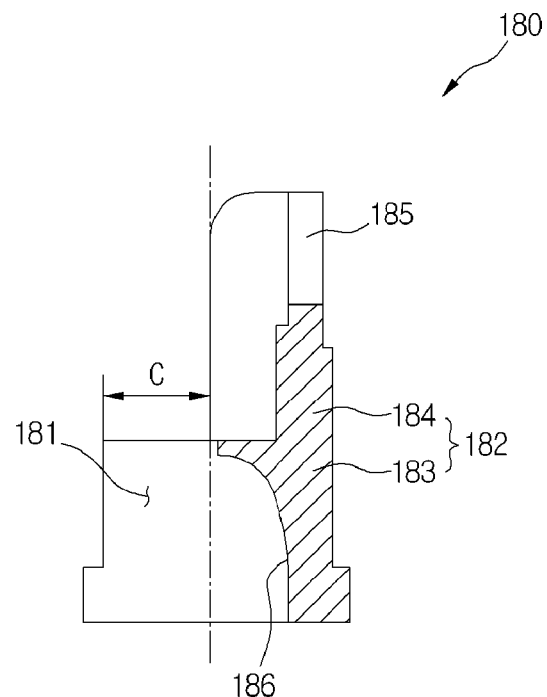
FIG. 4 is a cross-sectional view taken along line 4-4 in FIG. 3.
Figure 5:
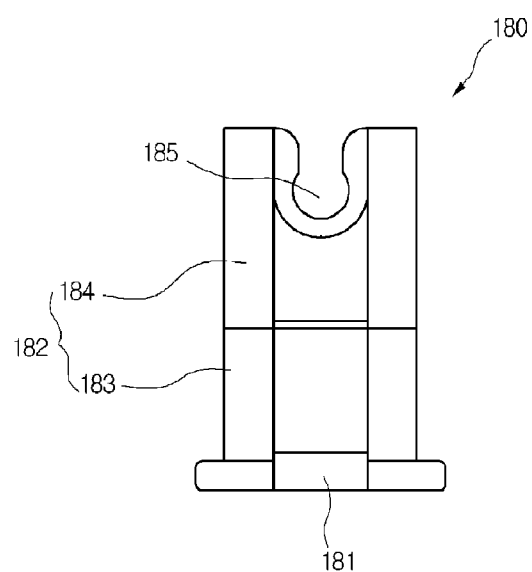
FIG. 5 is a front view of a taper holder in a gas cylinder according to the present invention.
Figure 6:
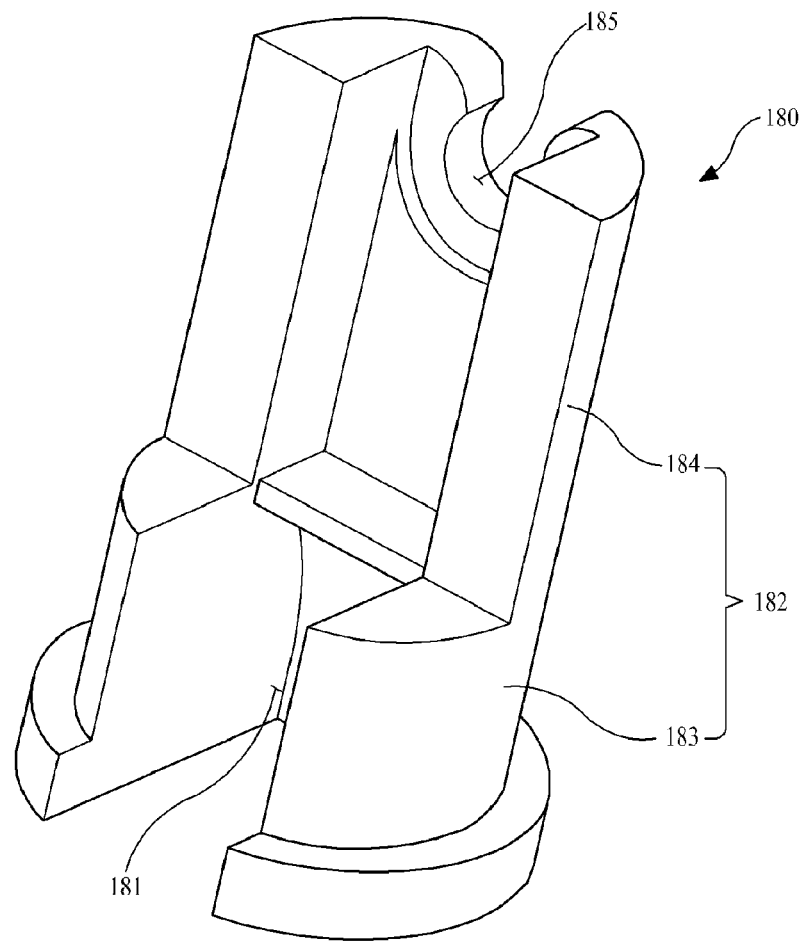
FIG. 6 is an external perspective view of a taper holder in a gas cylinder according to the present invention.

FIG. 3 is a top plan view of a taper holder in a gas cylinder according to the present invention; FIG. 4 is a cross-sectional view taken along line 4-4 in FIG. 3; FIG. 5 is a front view of a taper holder in a gas cylinder according to the present invention; and FIG. 6 is an external perspective view of a taper holder in a gas cylinder according to the present invention.

Referring to FIGS. 3 to 6, there are within a taper holder 180 of a predetermined shape further comprised of an arm insertion hole 181 which is formed larger to some extent than the thickness of said release arm 170 so that the release arm 170 can be inserted therein; an arm guide part 182 which forms both side walls of said arm insertion hole 181; a guide plane 186 of a shape slowly curved in a particular form similar to shift position of the pin pressing part 172 in order that rotation of said release arm 170 can be smoothly guided by contact plane to plane with said pin pressing part (referring to 172 of FIG. 2); and a cable insertion groove 185 which is formed dented at upper end part of said arm guide part 182.

Moreover, a cable holder 166 having a predetermined hole formed therein is fixed at said cable insertion groove 185 in order that cable position can be guided.

More particularly, said arm guide part 182 is formed with a lower arm guide part 183 wherein at least one part of hooking prominence 171 of said release arm 170, pin pressing part 172, and vertical interval retaining part 173 is inserted. And there are further formed with an upper arm guide part 184 wherein at least one part of said cable hooking part 175, horizontal interval retaining part 174, and said vertical interval retaining part 173 gets inserted.

In addition, an opening can be formed at one side of said taper holder, that is, at entrance of arm insertion hole 181. In other words, a part of side of said cylinder-shaped taper holder 180 may be cut out. In this way, production cost can be reduced as much as this cut-out portion.

The correlation between said release arm 170 and taper holder 180 can be described as below.

Said vertical interval retaining part 173, being a part of said release arm 170, enables said release arm 170 to be relieved over from the range formed by a lower arm guide part 182 and move back and forth. Especially, said vertical interval retaining part 173 can be shaken back and forth within the range of width of said arm insertion hole 181 (referring to interval C of FIG. 4).

In addition, said vertical interval retaining part 173 can, due to enlarged momentum by enlargement of distance between said cable hooking part 175 and said pin pressing part 172, enable an external force applied to cable hooking part 175 to be even larger at said pin pressing part 172. In this way, though in case when the pulling force for cable hooking part 175 is small, the force applied to pin pressing part 172 gets larger in some extent, so the reliability in operation of the gas cylinder can be enhanced.

Moreover, said horizontal interval retaining part 174 is formed bent for a predetermined length from said vertical interval retaining part 173 to approximately horizontal direction and more particularly to left-upper side direction, so that operational width of release arm 170 can be smoothly secured when cable 165 is pulled. In other words, if said horizontal interval retaining part 174 were not formed as described above, the upper end part of release arm 170 would interfere with said upper arm guide part 184 on maximum pulling of said release arm 170. That is why said horizontal interval retaining part 174 should be formed for preventing such interference.

Functions between said release arm 170 and taper holder 180 will be described as bellow.

Said release arm 170 gets inserted at lower side of said taper holder 180 and positioned at said arm insertion hole 181. At this time, opened part at lower side of said arm insertion hole 181 is formed larger than said release arm 170, so said release arm 170 can be inserted without any obstruction.

When said release arm 170 gets received within said arm insertion hole 181, said pin pressing part 172 contacts plane to plane with said guide plane 186, so release arm 170 is stably supported at its one side. And said hooking prominence 171 gets contacted with and caught at arm hooking part 192 of taper holder supporter 190 (which will be described later), so the release arm 170 is stably supported at its other side. Moreover, a gas opening/closing pin 151 placed at lower side of said release arm 170 can sustain weight of release arm 170, and thus overall position of said release arm 170 can be stably maintained.

In addition, when said release arm 170 changes its position, release arm 170 is guided for its position change according to contacting state between pin pressing part 172 and guide plane 186 and contacting state between hooking prominence 171 and arm hooking part 192, and therefore said release arm 170 can operate stably. Especially, being caught at arm hooking part 192, said hooking prominence 171 can function in operation as an overall central point for rotation of release arm 170.

Figure 7:
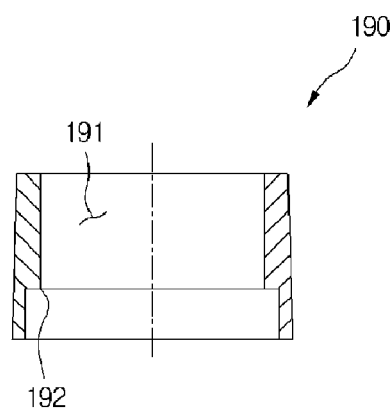
FIG. 7 is a cross-sectional view of a taper holder supporter in a gas cylinder according to the present invention.
Figure 8:
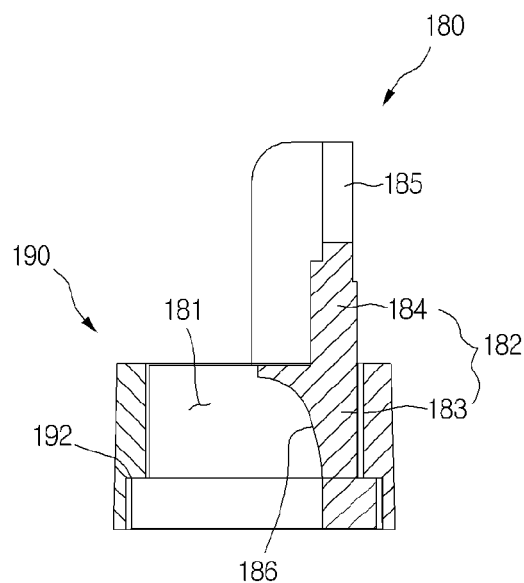
FIG. 8 is a cross-sectional view in combination of a taper holder and a taper holder supporter in a gas cylinder according to the present invention.

FIG. 7 is a cross-sectional view of a taper holder supporter in a gas cylinder according to the present invention; and FIG. 8 is a cross-sectional view in combination of a taper holder and a taper holder supporter in a gas cylinder according to the present invention.

Referring to FIG. 7, said taper holder supporter 190 is formed in a hollow cylindrical shape. Said taper holder supporter 190 is formed at hollow part thereof with a combination hole 191 whereto said taper holder 180 can be inserted.

By the way, said combination hole 191 of taper holder supporter 190 is formed to have a stepped portion in such a manner that diameter of lower part is larger than that of upper part. At this stepped portion is formed an arm hooking part 192 in order for taper holder 180 not to slip out from taper holder supporter 190.

Referring to FIG. 8, said taper holder 180 is combined with the combination hole 191 according to a way of insertion from bottom upward.

Moreover, the outer diameter of lower end of said taper holder 180 is formed a bit larger than diameter of arm hooking part 192 of said taper holder supporter 190, so that said taper holder 180 can not escape upward out of taper holder supporter 190.

By the way, the outer diameter of upper end of said taper holder 180 is preferably formed smaller in some extent than diameter of said taper holder supporter 190. This is so in order that taper holder 180 connected to said cable 165 can rotate smoothly when said cable 165 rotates. By such configurations, said taper holder 180 can rotate along the inner peripheral plane of said taper holder supporter 190. Therefore, even though a chair mounted by a gas cylinder is rotated by a user, said cable 165 can be prevented from kinking or twisting.

Preferably before said taper holder 180 and taper holder supporter 190 are combined together, a lubricant can be applied at the contact plane between outer peripheral plane of said taper holder 180 and inner peripheral plane of said taper holder supporter 190, so that said taper holder 180 can smoothly rotate.

Figure 9:
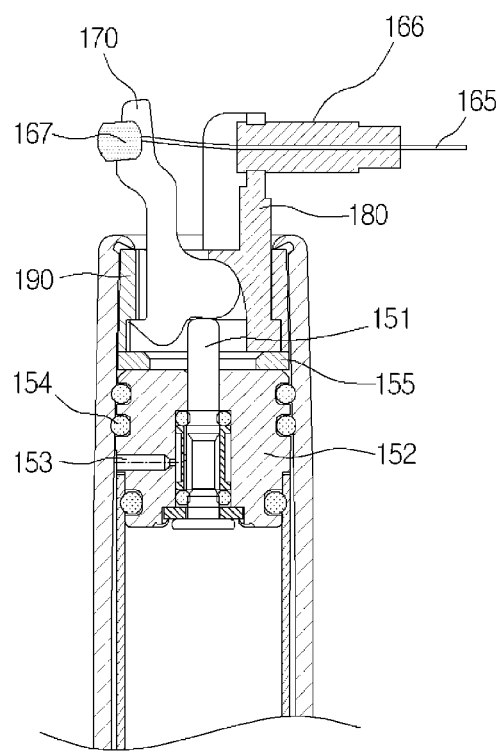
FIG. 9 is a drawing to explain the motion of the present invention, describing a state when external force is not applied at the gas opening/closing pin.

FIG. 9 is a drawing to explain the motion of the present invention, describing a state when external force is not applied at the gas opening/closing pin.

Referring to FIG. 9, in case an external force is not applied by user, the cable 165 has not been pulled, and release arm 170 has rotated counterclockwise from rotational center that is said hooking prominence 171.

Under this state, said pin pressing part 172 has not pressed gas opening/closing pin 151, and the gas is not flowing to move between said chambers 161 and 162. Accordingly, up and down motion of said gas cylinder has stopped.

Figure 10:
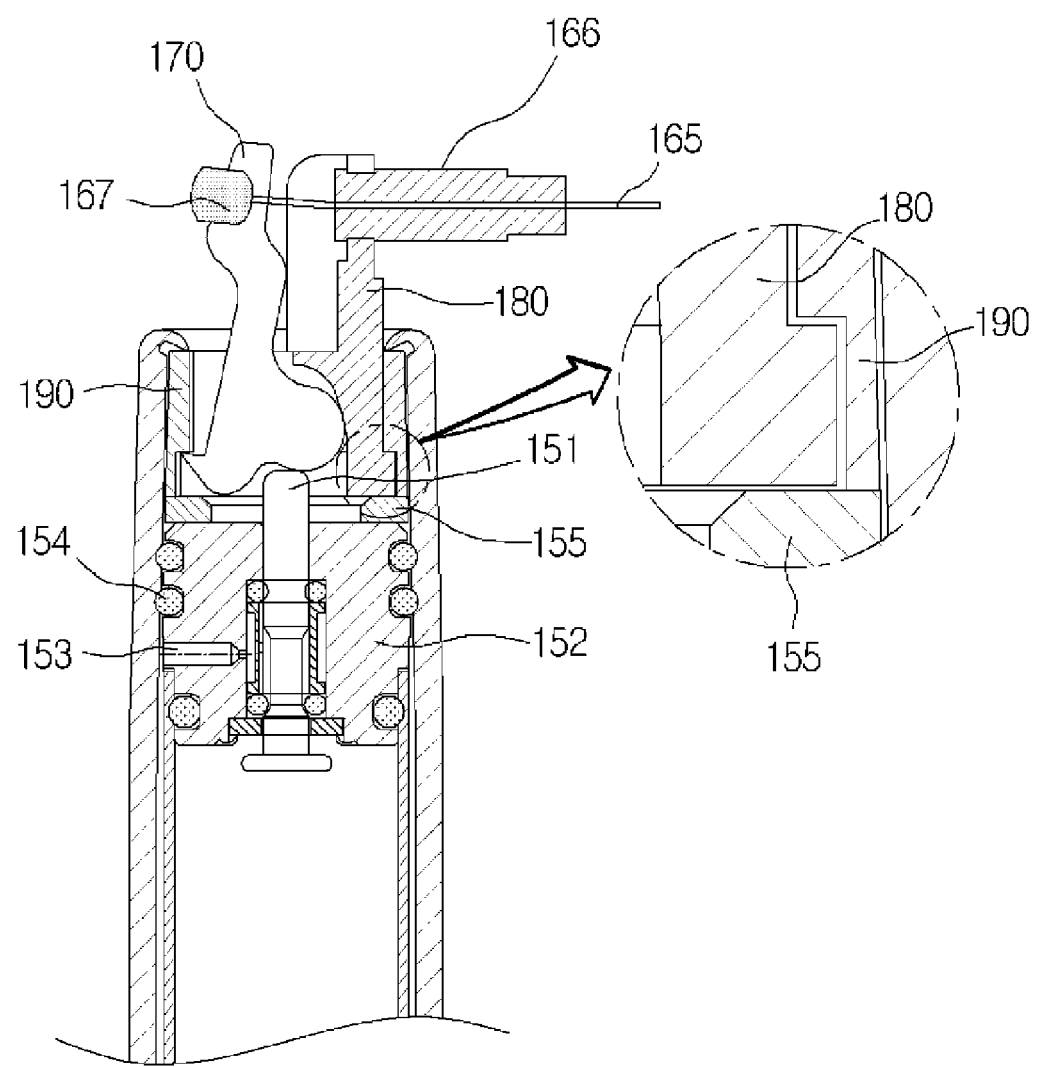
FIG. 10 is a drawing to explain the motion of the present invention, describing a state when external force is applied at the gas opening/closing pin.

FIG. 10 is a drawing to explain the motion of the present invention, describing a state when external force is applied at the gas opening/closing pin.

Referring to FIG. 10, in case an external force has been applied by user, the cable 165 has been pulled, and release arm 170 has rotated clockwise from rotational center that is said hooking prominence 171.

Under this state, said pin pressing part 172 is pressing gas opening/closing pin 151, and it is possible for the gas to flow and move between said chambers 161 and 162. Accordingly, said gas cylinder can move up and down. That is, in case a user is seated on the seat of chair, the spindle moves downwards so as to make gas cylinder shrink; and in case a user is not seated on the seat of chair, the spindle moves upwards so as to make gas cylinder expand.

Especially, upon operation of said release arm 170, the release arm 170 is capable of stably operating because lower plane at slowly curved part of said pin pressing part 172 presses said gas opening/closing pin 151 while side plane at slowly curved part of said pin pressing part 172 contacts plane to plane with said guide plane 186. Moreover, thanks to said hooking prominence 171 being caught at said arm hooking part 192, said release arm 170 does not change its position by parallel movement, but does rotational movement around a rotational center as the peak of end of hooking prominence 171.

The above-described release arm 170 can be supported for its movement by taper holder 180 without any additional configurations. In addition, when release arm 170 does not move but stands still, the weight of release arm 170 can be supported by gas opening/closing pin 151, so release arm 170 can be stably positioned.

As having been described hereinbefore for the cable operated gas cylinder according to present invention, the cable does not kink or twist due to the taper holder formed rotational, and accordingly operation reliability and product durability are enhanced.

Moreover, the cable operated gas cylinder according to present invention can be operated more conveniently by a user and assembled more simply at production spot.

Moreover, the cable operated gas cylinder according to present invention has advantageous effects of further more increased reliability and stability in operation and still further lowered production cost.

What is claimed is:

1. A cable operated gas cylinder comprising:
a base tube having a hollow portion therein;
a spindle inserted into the hollow portion of the base tube and movable up and down;
a cylinder received within said spindle;
a pipe holder which is installed on an upper part of the cylinder and seals airtight the upper part of the cylinder;

a gas opening/closing pin which penetrates a central part of the pipe holder to control the gas flow within the cylinder;

a release arm which is installed at an upper side of the gas opening/closing pin and for controlling operation of the gas opening/closing pin;

a cable having one end which is fixed at the release arm, to pivot the release arm by external force; and a taper holder which is accommodated within the spindle and receives the release arm therein in a manner that the release arm is freely rotatable together with the taper holder; and a taper holder supporter through which the taper holder passes, the taper holder supporter having a stepped part at an inner surface thereof;

wherein one lower end portion of the release arm is in contact with the inner surface of the taper holder, and the other lower end portion of the release arm is hooked by the stepped part of the taper holder supporter, and wherein the release arm is pivotable within the taper holder, without being fixed to any inner portion of the taper holder, and wherein a portion of the taper holder is completely open from the upper end to the lower end, such that the release arm is allowed to be at least transversely inserted in the taper holder.

2. The cable operated gas cylinder according to claim 1, wherein the release arm includes:

a hooking prominence which protrudes at one side of the lower end part thereof;

a pin pressing part which is formed at substantially opposite side of the hooking prominence and is smoothly rounded;

a vertical interval retaining part which extends upwardly from the pin pressing part;

a horizontal interval retaining part which is slightly bent at the upper end of the vertical interval retaining part; and a cable hooking part which extends upwardly from the horizontal interval retaining part.

3. The cable operated gas cylinder according to claim 2, wherein the one lower end portion of the release arm is the pin pressing part, and the other lower end portion is the hooking prominence.

4. The cable operated gas cylinder according to claim 2, wherein the taper holder includes a lower arm guide part, and wherein the lower arm guide part has an arm insertion hole which is defined by a guide plane, the guide plane being smoothly curved and in contact with the pin pressing part to guide the pivotal movement of the pin pressing part.

5. The cable operated gas cylinder according to claim 4, wherein the taper holder includes an upper arm guide part integrally extends from the upper end of the lower arm guide part, and wherein the upper arm guide part has at an upper end portion a cable insertion groove.

6. The cable operated gas cylinder according to claim 1, wherein the taper holder is configured to be assembled with the taper holder supporter in a manner that the taper holder is inserted from the bottom of the taper holder supporter upward.

7. The cable operated gas cylinder according to claim 4, wherein the taper holder has at a lower end portion a stepped part of which outer diameter is bigger than the outer diameter of the lower arm guide part, and wherein the stepped part of the taper holder is fitted in the stepped part of the taper holder supporter, to prevent the separation of the taper holder from the taper holder supporter.

8. The cable operated gas cylinder according to claim 4, further comprising a washer interposed between the taper holder supporter and the pipe holder, to help smooth rotation of the assembly of the release arm, the taper holder and the taper holder supporter.

9. The cable operated gas cylinder according to claim 1, wherein the outer diameter of the taper holder is less than the inner diameter of the taper holder supporter, and wherein a lubricant is provided in the gap between the taper holder and the taper holder supporter.

10. A cable operated gas cylinder comprising:

a base tube;

a spindle movably inserted into the base tube;

a taper holder supporter received in an upper inner end of the spindle;

a taper holder upwardly passing through and hooked to the taper holder supporter, the taper holder being freely rotatable;

a pipe holder located below the taper holder;

a gas opening/closing pin which vertically penetrates the pipe holder to control the gas flow within the cylinder;

a release arm of which at least a portion is pivotally accommodated within the taper holder to selectively press the gas opening/closing pin; and a cable connected to the release arm, the release arm pivoted by the horizontally oriented external force to the cable, wherein one lower end portion of the release arm is in contact with the inner surface of the taper holder, and the other lower end portion opposite to the one lower end portion of the release arm is connected in contact to the taper holder supporter, and wherein a portion of the taper holder is completely open from the upper end to the lower end, such that the release arm is allowed to be transversely inserted in the taper holder.

* * * * *